UNITED STATES PATENT OFFICE.

GEORGE ARTHUR JARVIS, OF WELLINGTON, ENGLAND.

MANUFACTURE OF IRON AND STEEL.

1,303,799.  Specification of Letters Patent.  Patented May 13, 1919.

No Drawing.  Application filed September 19, 1917. Serial No. 192,096.

*To all whom it may concern:*

Be it known that I, GEORGE ARTHUR JARVIS, residing at the Shrubbery, St. Georges, Wellington, in the county of Salop, England, subject of the King of Great Britain and Ireland, have invented certain new and useful Improvements Relating to the Manufacture of Iron and Steel, of which the following is a specification.

This invention comprises means as hereinafter described for the more effective utilization of scrap or waste material, such as steel turning, in the manufacture of iron and steel.

According to already known methods for carburizing molten iron or steel, there is added to the molten mass a mixture of carbon, such as graphite, with iron or steel turnings, the said mixture being agglomerated by means of tar, pitch or the like. Such a method utilizes only a small quantity of scrap metal, as the latter merely serves as a carrier or as the means for introducing carbon to an already molten mass of iron or steel.

In accordance with this invention the turnings or similar scrap material which is to form the whole or a considerable part of a furnace charge is first crushed or powdered and is then treated or coated with tar or tar and pitch mixed with sufficient slaked or ground lime to counteract the sulfur in the tar or pitch and also that in the fuel employed for the subsequent smelting or furnace process. A further addition is made to the mixture, when iron is to be produced, by the introduction thereto of carbid of silicon or its equivalent in the form of carborundum waste or otherwise in order that the resultant of the melting of the scrap material treated with the said mixture shall be a gray iron suitable for general foundry purposes.

The tar or like mixture as aforesaid provides the required amount of carbon for the scrap steel, while the carbid of silicon addition to the mixture insures the production of an easily melted fluid gray iron. For white iron and mottled iron less of the mixture is required.

The crushed turnings or like scrap steel soaked and coated with the mixture may be left under cover for the hardening of the coating, or such hardening may be effected by gentle heat in a kiln or otherwise. The material is then ready to be charged in the cupola or furnace in any convenient manner.

The steel turnings and the like can be crushed in a mill, such as a mortar or clay mill or its equivalent, and the tar or like mixture added thereto during or at the conclusion of such crushing so that the whole may be effectually incorporated. When the scrap is rusty or dirty it may be sifted after crushing and prior to the introduction of the mixture.

Cast iron turnings can be used with the steel or wrought iron turnings or scrap.

For steel making, the mixture for the scrap material is preferably free from the addition of silicon. The treated material may advantageously form the major part of the charge for the ordinary mixer or for an open hearth furnace.

The tar or pitch employed for the mixture is preferably that obtained from by-product coke ovens rather than that from gas works. Wood tar is also suitable.

Having thus described my invention what I claim as new and desire to secure by Letters Patent is:—

1. The process of preparing iron and steel turnings for re-melting, which consists in crushing the said material to powder and incorporating with such powder a mixture of tar and lime, as set forth.

2. The process of preparing iron and steel turnings for re-melting which consists in crushing the said material to powder and incorporating with such powder a mixture of tar, lime and silicon, as set forth.

3. The process of preparing iron and steel turnings for re-melting which consists in crushing the said material to powder, incorporating with the powder a mixture of tar and lime and subsequently subjecting it to a baking heat, as set forth.

In testimony whereof I have signed my name to this specification.

GEORGE ARTHUR JARVIS.